(12) United States Patent
Chang et al.

(10) Patent No.: US 7,180,711 B1
(45) Date of Patent: Feb. 20, 2007

(54) HEAD STACK ASSEMBLY WITH AN ACTUATOR BODY AND FLEX CABLE GUIDING SUPPORT AND METHOD OF MAKING THE SAME

(75) Inventors: Ken L. Chang, Saratoga, CA (US); Kamran Oveyssi, San Jose, CA (US); Shawn E. Casey, San Jose, CA (US); Chaw-Wu Tseng, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 421 days.

(21) Appl. No.: 10/816,536

(22) Filed: Mar. 31, 2004

(51) Int. Cl.
*G11B 5/55* (2006.01)

(52) U.S. Cl. .................................................. 360/264.2
(58) Field of Classification Search .............. 360/264.2
See application file for complete search history.

(56) References Cited

U.S. PATENT DOCUMENTS 5,375,021 A * 12/1994 Boeckner ................. 360/264.2
5,680,277 A * 10/1997 Bonn et al. ............... 360/264.2
5,953,183 A * 9/1999 Butler et al. ............. 360/264.2

* cited by examiner

*Primary Examiner*—Robert S. Tupper
(74) *Attorney, Agent, or Firm*—Stetina Brunda Garred & Brucker; Joshua C. Harrison, Esq.

(57) ABSTRACT

A head stack assembly for a disk drive. The head stack assembly includes an actuator body. The actuator body includes a main body section defining a horizontal plane orthogonal to an axis of rotation. The actuator body further includes an actuator arm extending from the main body section. The actuator body further includes a flex cable guiding support extending from the main body section adjacent the actuator arm orthogonal to the horizontal plane. The head stack assembly further includes a flex cable including a substantially flat main cable body disposed in mechanical communication with the flex cable guiding support in planes orthogonal to the horizontal plane parallel to the axis of rotation.

9 Claims, 4 Drawing Sheets

HEAD STACK ASSEMBLY WITH AN ACTUATOR BODY AND FLEX CABLE GUIDING SUPPORT AND METHOD OF MAKING THE SAME

BACKGROUND OF THE INVENTION

1. Field of the Invention

The present invention relates generally to disk drives, and in particular to a disk drive including a head stack assembly with a flex cable guiding support and method of making the same.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base and supports a lowermost one of the disks. The head stack assembly has an actuator assembly having at least one air bearing slider, typically several, for reading and writing data from and to the disk. Each slider includes a transducer head for reading and writing data. The printed circuit board assembly includes a servo control system in the form of a disk controller for generating servo control signals. The head stack assembly is controllably positioned in response to generated servo control signals from the disk controller. In so doing, the attached sliders are controllably moved relative to tracks disposed upon the disk for reading and writing operations.

The head stack assembly includes an actuator assembly, at least one head gimbal assembly, and a flex circuit assembly. A conventional "rotary" or "swing-type" actuator assembly typically includes an actuator having an actuator body. The actuator body is configured to rotate on a pivot assembly between limited positions about an axis of rotation. One or more actuator arms extend from one opposite side of the actuator body. A head gimbal assembly is distally attached to each of the actuator arms. A head gimbal assembly includes an air bearing slider that is attached to a suspension with a gimbal. The suspension resiliently supports the air bearing slider above the tracks of the disk during operation of the disk drive facilitating the slider to "fly" above the disk.

A coil is supported by a coil support that extends from an opposite side of the actuator body. The coil is configured to interact with one or more permanent magnets to form a voice coil motor. The coil is disposed in electrical communication with the disk controller through a flex circuit assembly. Controlled movement of the head stack assembly is achieved by selectively energizing the coil with the generated servo control signals.

The flex circuit assembly is configured (1) to supply current to the actuator coil and (2) to carry signals between the transducer heads and the printed circuit board assembly. The flex circuit assembly includes a flex cable (also referred to as a flex circuit cable or flex circuit), an integrated circuit device, and a cable connector.

At one end of the flex cable there is provided a mounting portion which is attached to the actuator body. Adjacent to the mounting portion, the flex cable contains a terminal pad portion for connecting a plurality of electrically conductive traces embedded within the flex cable to electrical connectors, such as insulated wires. The wires extend along each actuator arm to each transducer head for transmitting data signals to and from the transducer heads. At an opposing end of the flex cable, there is provided a cable connector that is attached to the disk drive base and electrically connected to the printed circuit board assembly.

The flex cable typically includes a base film, a plurality of electrically conductive traces and a cover film. The base film is commonly formed of a polyimide material. The electrically conductive traces are formed upon the base film. The cover film is then selectively disposed over the metal traces and the base film for electrically insulating the traces. Adjacent to the mounting portion of the flex cable, the integrated circuit device is supported by the base film and is electrically connected to the traces. The integrated circuit device includes a preamplifier for enhancing signals passed from the transducer heads.

The flex cable includes a dynamic loop portion that is supported by a cable guide. The cable guide conventionally takes the form of a plastic clip attached to the actuator body. The cable guide maintains the dynamic loop portion in an upright position in planes parallel to the axis of rotation. This configuration permits relatively free rotation of the overall head stack assembly.

As can be appreciated, a reduction in the complexity of manufacturability and assembly with respect to head stack assembly would represent an improved head stack assembly configuration in comparison to the prior art.

SUMMARY OF THE INVENTION

According to an aspect of the present invention, there is provided a head stack assembly for a disk drive. The head stack assembly includes an actuator body. The actuator body includes a main body section defining a horizontal plane orthogonal to an axis of rotation. The actuator body further includes an actuator arm extending from the main body section. The actuator body further includes a flex cable guiding support extending from the main body section adjacent the actuator arm orthogonal to the horizontal plane. The head stack assembly further includes a flex cable including a substantially flat main cable body disposed in mechanical communication with the flex cable guiding support in planes orthogonal to the horizontal plane parallel to the axis of rotation.

According to various embodiments, the actuator body may be formed of a stamped material. The actuator body is formed of an integrated piece of material. The flex cable guiding support may be integrally formed with the main body section. The actuator body may be formed of a sheet metal material. The flex cable guiding support may be bent from a position within the horizontal plane. The flex cable guiding support may include first and second extensions extending from the main body section adjacent. The flex cable includes opposing sides, and the first and second extensions are respectively disposed in mechanical communication with respective ones of the opposing sides of the flex cable. The actuator arm may extend from the main body section along the horizontal plane.

According to another aspect of the present invention, there is provided an actuator for use with a flex cable in a disk drive as described above. Further according to another aspect of the present invention, there is provided the disk drive. The disk drive includes the disk drive base and the actuator body rotatably coupled to the disk drive base. The actuator body is as describe above.

According to yet another aspect of the present invention, there is provided a method of manufacturing the actuator for use with the flex cable in the disk drive. The flex cable includes a substantially flat main cable body. The method includes stamping the integrated actuator body from a sheet material. The actuator body includes a main body section defining a horizontal plane orthogonal to an axis of rotation. The actuator body further includes an actuator arm extending from the main body section. The actuator body further includes a flex cable guiding support portion extending from the main body section adjacent the actuator arm. The method further includes bending the flex cable guiding support portion to be orthogonal to the horizontal plane for supporting the main cable body in a planes orthogonal to the horizontal plane parallel to the axis of rotation to thereby form a flex cable guiding support. The sheet material may be a sheet metal material.

DESCRIPTION OF THE PREFERRED EMBODIMENTS

Figure 1:
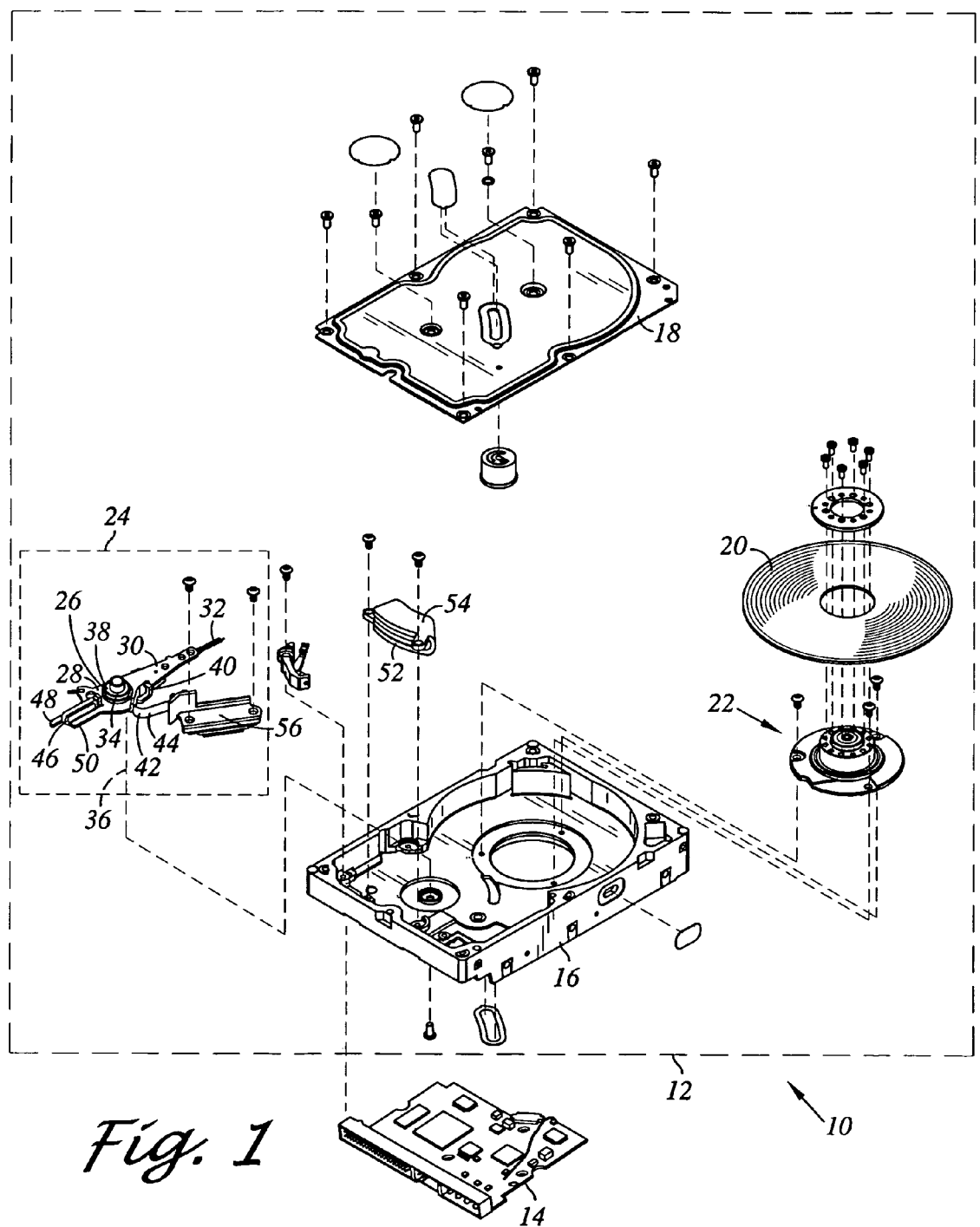
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1–9 illustrate a head stack assembly and a disk drive in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a magnetic disk 20. The disk 20 contains a plurality of tracks for storing data. The head disk assembly 12 further includes a spindle motor 22 for rotating the disk 20. The head disk assembly 12 further includes a head stack assembly 24 rotatably attached to the disk drive base 16 in operable communication with the disk 20. The head stack assembly 24 includes a rotary actuator 26.

The actuator 26 includes an actuator body 28 and an actuator arm 30 that extends from the actuator body 28. Distally attached to the actuator arm 30 is a head gimbal assembly 32. The head gimbal assembly 32 includes a slider. The slider includes a transducer head. The actuator body 28 includes a bore, and the actuator 26 further includes a pivot bearing cartridge 34 engaged within the bore for facilitating the actuator body 28 to rotate between limited positions about an axis of rotation 36.

Figure 2:
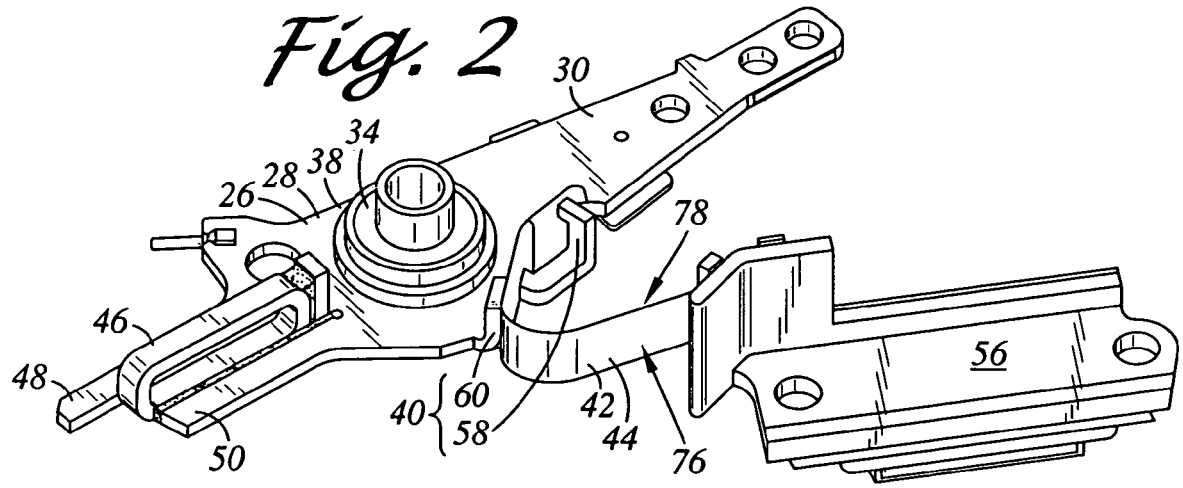
FIG. 2 is an enlarged perspective view of a head stack assembly including an actuator of FIG. 1.
Figure 3:
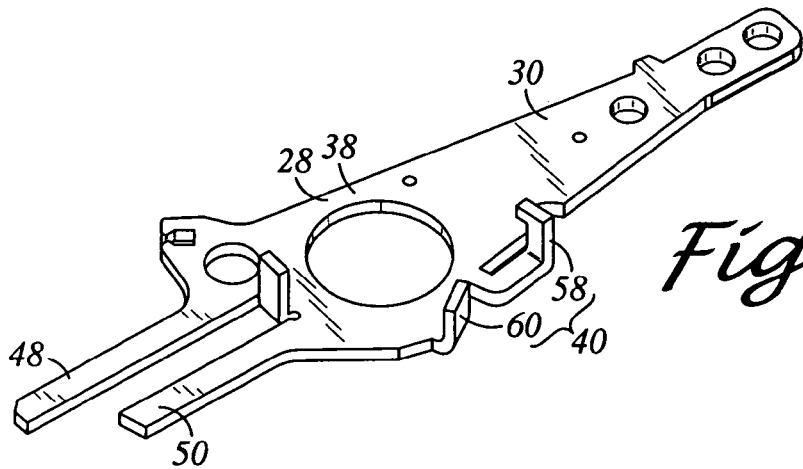
FIG. 3 is a perspective view of an actuator body of FIG. 2.
Figure 4:
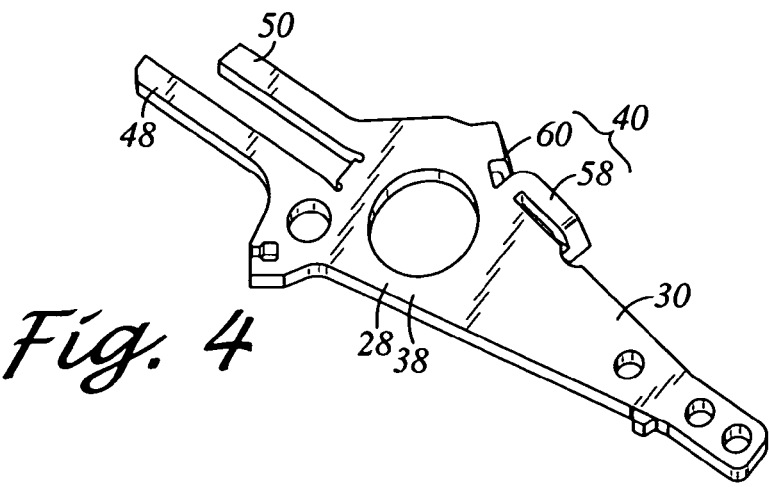
FIG. 4 is a bottom perspective view of the actuator body of FIG. 3.

Shown in FIG. 2 is an enlarged perspective view of the head stack assembly 24 including the actuator 26 of FIG. 1. FIG. 3 is a perspective view of an actuator body 28 of FIG. 2 and FIG. 4 is a bottom perspective view of the actuator body 28 of FIG. 3.

According to an aspect of the present invention, there is provided the head stack assembly 24 for the disk drive 10. The head stack assembly 24 includes an actuator body 28. The actuator body 28 includes a main body section 38 defining a horizontal plane orthogonal to the axis of rotation 36. The actuator body 28 further includes the actuator arm 30 extending from the main body section 38. The actuator body 28 further includes a flex cable guiding support 40 extending from the main body section 38 adjacent the actuator arm 30 orthogonal to the horizontal plane. The head stack assembly 24 further includes a flex cable 42 including a substantially flat main cable body 44 disposed in mechanical communication with the flex cable guiding support 40 in planes orthogonal to the horizontal plane parallel to the axis of rotation 36.

Advantageously, because the actuator 26 includes the flex cable guiding support 40, use of additional parts such as a flex cable guide is avoided, as well as those cost and assembly burdens associated with the same.

In the embodiment shown, the actuator body 28 may be formed of a single integrated piece of material. Further, the actuator body 28 may be formed of a stamped material. In this embodiment, it is contemplated that the actuator body 28 is relatively simple to manufacture as it is formed of an integrated stamped material. Preferably the actuator body 28 is formed of a sheet metal material. This may take the form of rolled aluminum sheet material. As used herein the term stamped refers to a manufacturing process which is well known to one of ordinary skill in the art and involves the deformation of material from a generally flat piece of material. This is in contrast to such other processes such as machining which is relatively more complex and therefore a relatively more costly process. It is contemplated that the actuator body 28 may be formed through other processes which may be chosen from those well known to one of ordinary skill in the art, such as machining. To the extent that multiple actuator arms 30 are required, the actuator arms 30 may be machined from a single piece of material or separately stamped and then adhesively bonded, mechanically swaged, laser welded or plastic overmolded for examples.

The flex cable guiding support 40 may be bent from a position within the horizontal plane. As will be appreciated, this facilitates a relatively simple manufacturing process as is discussed further below. The flex cable guiding support 40 may extend from the main body section 38. Preferably the flex cable guiding support 40 is integrally formed with the main body section 38. Although not shown it is contemplated that the flex cable guiding support 40 may extend from the actuator arm 30 as well.

Figure 5:
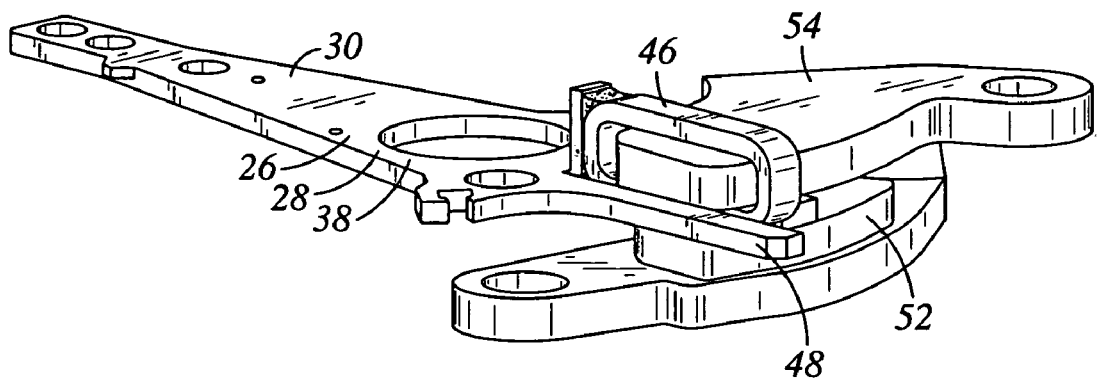
FIG. 5 is a perspective view of the actuator shown in relation to a voice coil motor yoke.

Referring additionally to FIG. 5, in the embodiment shown, the actuator 26 includes a vertical coil 46. The actuator body 28 includes a pair of coil support extensions 48, 50 and a coil support tab for supporting the coil 46 in the vertical orientation. It is contemplated that a more conventional horizontally oriented coil configuration may be utilized. A voice coil magnet 52 is supported by a yoke 54 which is coupled to the disk drive base 16. The coil 46 interacts with the magnet 52 to form a voice coil motor for controllably rotating the actuator 26. The coil 46, the voice coil magnet 52, and the yoke 54 are sized and configured to produce the desired magnetic properties according to those techniques which are well known to one of ordinary skill in the art.

The head stack assembly 24 further includes a cable connector 56. The cable connector 56 is attached to the disk drive base 16 and is disposed in electrical communication between the flex cable 42 and the printed circuit board 14. The flex cable 42 supplies current to the coil 46 and carries signals between the transducer head and the printed circuit board assembly 14.

As mentioned above the main cable body 44 is characterized as being substantially flat. In this regard a substantially flat main cable body 44 refers to the various portions across their respective main cable body 44 that have a common dimension which is aligned. Thus, as shown the various portions of the main cable body 44 have a common dimension which are vertically aligned while the remaining dimensions are generally curved in a dynamic loop.

The flex cable guiding support 40 may include first and second extensions 58, 60 extending from the main body section 38 adjacent the actuator arm 30. The flex cable 42 includes opposing sides 76, 78, and the first and second extensions 58, 60 are respectively disposed in mechanical communication with respective ones of the opposing sides 76, 78 of the flex cable 42. Preferably the flex cable 42 is not attached to the first or second extensions 58, 60 but merely resting against the first and second extensions 58, 60. In this regard, the flex cable 42 is releasably positioned against the first and second extensions 58, 60.

According to an aspect of the present invention, there is provided the disk drive 10. The disk drive 10 includes the disk drive base 16 and the actuator 26 rotatably coupled to the disk drive base 16. The actuator 26 is as described above. Further according to another aspect of the present invention, there is provided the actuator 26 as is described above.

Figure 6:
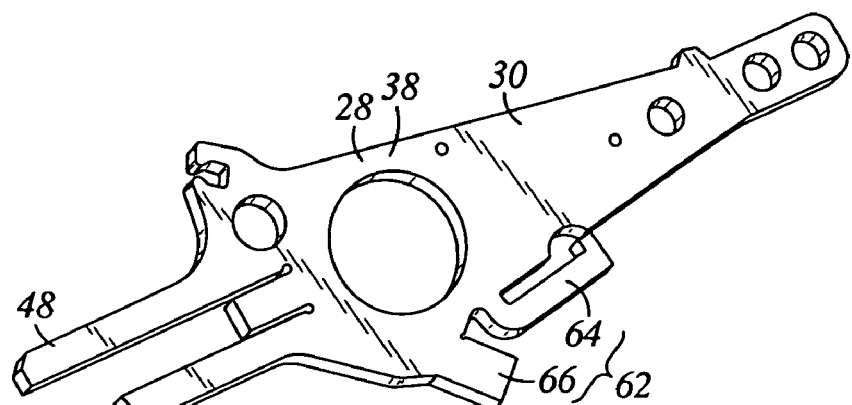
FIG. 6 is a perspective view of the actuator body prior to being completely formed.

According to yet another aspect of the present invention, there is provided a method of manufacturing the actuator 26 for use with the flex cable 42 in the disk drive 10. The flex cable 42 includes a substantially flat main cable body 44. Referring now to FIG. 6, the method includes providing the actuator body 28. The actuator body 28 includes the main body section 38 defining the horizontal plane orthogonal to the axis of rotation 36. The actuator body 28 includes the actuator arm 30 extending from the main body section 38. The actuator body 28 further includes a flex cable guiding support portion 62 extending from the main body section 38 adjacent the actuator arm 30. In the embodiment shown, the flex cable guiding support portion 62 takes the form of first and second extension portions 64, 66.

As shown in FIGS. 3 and 4, the method further includes bending the flex cable guiding support portion 62 to be orthogonal to the horizontal plane for supporting the main cable body 44 in planes orthogonal to the horizontal plane parallel to the axis of rotation 36 to thereby form the flex cable guiding support 40. In this embodiment, the first and second extension portions 64, 66 are bent to form the first and second extensions 58, 60. While the first and second extensions 58, 60 are depicted as being bent upward from a horizontal position, it is contemplated that the first and second extensions 58, 60 may be bent downward as well.

According to various embodiments, the actuator body 28 may be formed of a single integrated piece of material. The main body section 38 may be integrally formed with the flex cable guiding support 40. The method may include stamping the actuator body 28 from a sheet material. The completed actuator body 28 may be assembled with the coil 46 and the flex cable 42 as shown in FIG. 2.

Figure 7:
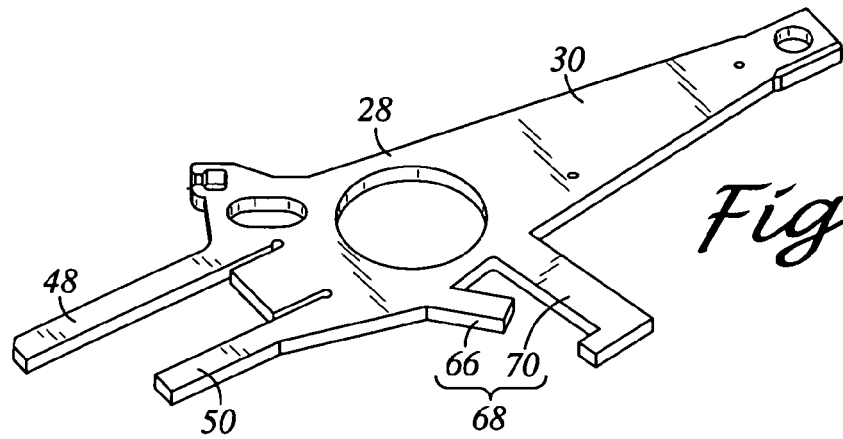
FIG. 7 is a perspective view of an actuator body prior to being completely formed according to another embodiment.
Figure 8:
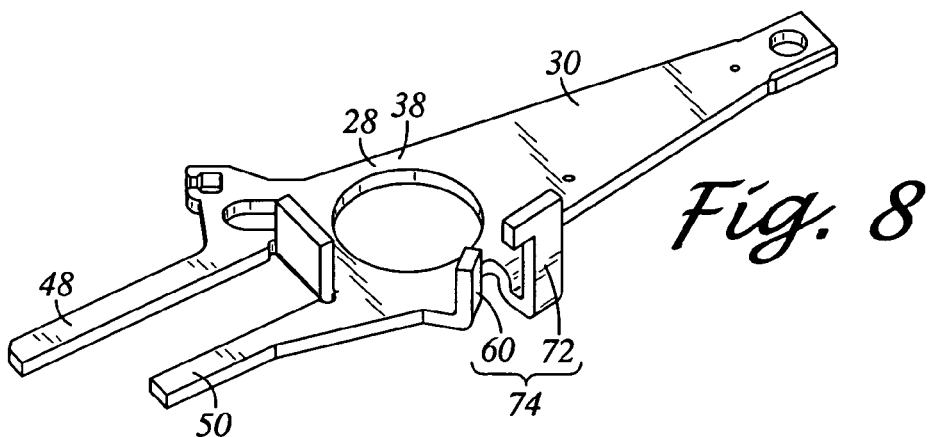
FIG. 8 is a perspective view of the actuator body of FIG. 7 after having been formed.
Figure 9:
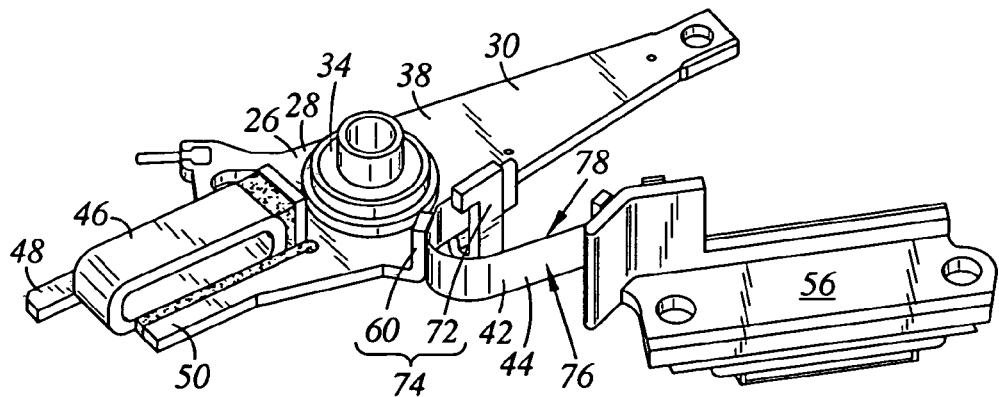
FIG. 9 is a perspective view of the actuator body of FIG. 8 as assembled to form an actuator.

Referring now to FIGS. 7–10 there is depicted another embodiment of the actuator body 28. FIG. 7 depicts the actuator body 28 which is similar to that shown in FIG. 6, however, the flex cable guiding support portion 62 is substituted with a flex cable guiding support portion 68. In this regard the first extension portion 58 is replaced with the first extension portion 70. As can be seen, the first extension portion 58 generally extends along the actuator arm 30, whereas the first extension portion 70 extends laterally with respect to the actuator arm 30. FIG. 8 is similar to that shown in FIG. 3, however, the flex cable guiding support 40 is substituted with a flex cable guiding support 74. In this regard, the first extension portion 58 is bent to form a first extension 72. As is illustrated by the two embodiments, the flex cable guiding support 40, 74 may be formed through bending in various directions, but nonetheless resulting in support structures that vertically support flex cable 42.

We claim:

1. A head stack assembly for a disk drive, the head stack assembly comprising:
   an actuator body including:
      a main body section having a thickness and defining a horizontal plane orthogonal to an axis of rotation;
      an actuator arm having the same thickness and extending from the main body section; and
      a flex cable guiding support having the same thickness and extending from the main body section adjacent the actuator arm orthogonal to the horizontal plane; and
   a flex cable including a substantially flat main cable body disposed in mechanical communication with the flex cable guiding support,
   wherein the main body section, the actuator arm, and the flex cable guiding support are a single component having material continuity rather than being an assembly of sub-components.

2. The head stack assembly of claim 1 wherein the actuator body comprises a stamped material.

3. The head stack assembly of claim 1 wherein the actuator body comprises a sheet metal material.

4. The head stack assembly of claim 1 wherein the flex cable guiding support includes a bent region adjacent the horizontal plane.

5. The head stack assembly of claim 1 wherein the flex cable guiding support includes first and second extensions extending from the main body section.

6. The head stack assembly of claim 5 wherein the flex cable includes opposing sides, the first and second extensions are respectively disposed in mechanical communication with respective ones of the opposing sides of the flex cable.

7. The head stack assembly of claim 1 wherein the actuator arm extends from the main body section along the horizontal plane.

8. An actuator for use with a flex cable in a disk drive, the flex cable including a substantially flat main cable body, the actuator comprising:
   an actuator body including:
      a main body section having a thickness and defining a horizontal plane orthogonal to an axis of rotation;
      an actuator arm having the same thickness and extending from the main body section; and
      a flex cable guiding support having the same thickness and extending from the main body section adjacent the actuator arm orthogonal to the horizontal plane for supporting the main cable body, wherein the main body section, the actuator arm, and the flex cable guiding support are a single component having material continuity rather than being an assembly of sub-components.

9. A disk drive comprising:

a disk drive base;

an actuator body rotatably coupled to the disk drive base, the actuator body including:

a main body section having a thickness and defining a horizontal plane orthogonal to an axis of rotation;

an actuator arm having the same thickness and extending from the main body section; and a flex cable guiding support having the same thickness and extending from the main body section adjacent the actuator arm orthogonal to the horizontal plane; and a flex cable including a substantially flat main cable body disposed in mechanical communication with the flex cable guiding support, wherein the main body section, the actuator arm, and the flex cable guiding support are a single component having material continuity rather than being an assembly of sub-components.

* * * * *